United States Patent [19]

Caneer, Jr.

[11] Patent Number: 4,692,584

[45] Date of Patent: Sep. 8, 1987

[54] GAS CONTROL SYSTEM FOR A PLASMA ARC WELDING APPARATUS

[76] Inventor: Clifford Caneer, Jr., Rte. 2, Box 24A, Cornersville, Tenn. 37047

[21] Appl. No.: 802,984

[22] Filed: Nov. 29, 1985

[51] Int. Cl.⁴ .............................................. B23K 9/04
[52] U.S. Cl. .................... 219/121 PU; 219/121 PT; 219/121 PR
[58] Field of Search .................... 219/74, 75, 121 PM, 219/121 PQ, 121 PU, 121 PT, 121 PW; 313/231.31, 231.41, 231.51; 137/485

[56] References Cited

U.S. PATENT DOCUMENTS

| | | | |
|---|---|---|---|
| 3,004,189 | 10/1961 | Giannini | 219/121 PU |
| 3,803,380 | 4/1974 | Ragaller | 219/121 PW |
| 3,988,566 | 10/1976 | Vogts et al. | 219/121 PU |
| 4,195,216 | 3/1980 | Beauchamp et al. | 219/121 PU |
| 4,580,032 | 4/1986 | Carkhuff | 219/121 PU |

Primary Examiner—M. H. Paschall
Attorney, Agent, or Firm—Christel, Bean & Linihan

[57] ABSTRACT

Plasma arc welding apparatus including a plasma torch having a body defining a flow passage for plasma gas an orifice through which plasma gas exits the torch as a high-temperature jet stream utilizes an actuatable slope control valve operatively connected in relatively close flow proximity with the torch orifice. By controlling the adjustment of the actuatable valve, the flow of plasma gas through the torch orifice is accurately controlled.

5 Claims, 4 Drawing Figures

GAS CONTROL SYSTEM FOR A PLASMA ARC WELDING APPARATUS

BACKGROUND OF THE INVENTION

This invention relates to plasma arc welding and relates, more particularly, to the control of plasma gas flow through the orifice of a plasma welding torch.

Plasma arc welding apparatus with which this application is concerned includes a plasma torch positionable in working relationship to a workpiece, means for moving the workpiece and torch relative to one another along a desired welding seam, a plasma gas source and an electric power supply. The torch includes a body defining a flow passage for plasma gas and an electrode supported within the flow passage. The torch flow passage is connected to the plasma gas source by means of a gas line for receiving plasma gas and defines an orifice through which the plasma gas exits the torch. The electric power supply is operatively connected between the electrode and the workpiece for passage of a current and an arc between the workpiece and the electrode, which arc is directed through the torch orifice so that plasma gas approaching the orifice exits the orifice as a high-temperature jet stream.

It is known that for some plasma welding applications, such as keyhole welding, welding factors such as the rate of gas flow through the torch orifice, the weld current and the relative speed of movement between the torch and workpiece must be accurately controlled to ensure a suitable weld in the workpiece. To this end, drive means are utilized for moving the torch and workpiece relative to one another, current control systems are connected to the power supply, and gas flow slope control means are operatively associated with the gas source. Furthermore, a computer is commonly connected to the drive means, current control systems and slope control means for automatically controlling the aforementioned factors during a welding operation.

Slope control means of conventional automatically-controlled welding apparatus commonly includes a slope control valve connected in the plasma gas flow line between the plasma gas source and the torch flow passage and remotely of the plasma torch. Because of such remote positioning of the control valve, any adjustment of the plasma gas flow necessarily occurs remotely of the torch. Such remote positioning provides a disadvantage in that an adjustment of the gas flow at the torch orifice in response to an adjustment of the valve is necessarily delayed. Furthermore, the portion of the gas line extending between the control valve and the torch is typically large in capacity when compared to the relatively small gas flows involved so that the aforesaid gas line portion provides, in effect, a gas reservoir from which plasma gas can seep into the torch unchecked. Both the time delay involved between the valve adjustment and a corresponding adjustment in the plasma gas flow at the torch and the reservoir effect of the gas flow line present difficulties in accurately controlling the flow of plasma gas through the torch.

It is an object of the present invention to provide a new and improved apparatus for accurately controlling gas slope through a torch during a plasma welding operation.

Another object of the present invention is to provide such an apparatus which circumvents difficulties associated with the control of gas slope in conventional plasma welding apparatus.

Still another object of the present invention is to provide such an apparatus which is economical to manufacture and effective in operation.

Yet still another object of the present invention is to provide a new and improved torch for plasma welding.

SUMMARY OF THE INVENTION

This invention resides in a plasma arc welding apparatus including a plasma torch positionable in operative relationship with a workpiece for working thereon wherein the torch includes a body defining a gas flow passage and wherein the flow passage is connectable to a plasma gas source for receiving plasma gas and defines an orifice through which plasma gas exits the torch as a high-temperature jet stream. The improvement is comprised of slope control valving means including an actuatuable gas valve operatively connected in relatively close flow communication with the torch orifice for accurately controlling the flow of plasma gas through the orifice.

BRIEF DESCRIPTION OF THE DRAWING FIGURES

DETAILED DESCRIPTION OF ILLUSTRATIVE EMBODIMENTS

Figures 1, 2:
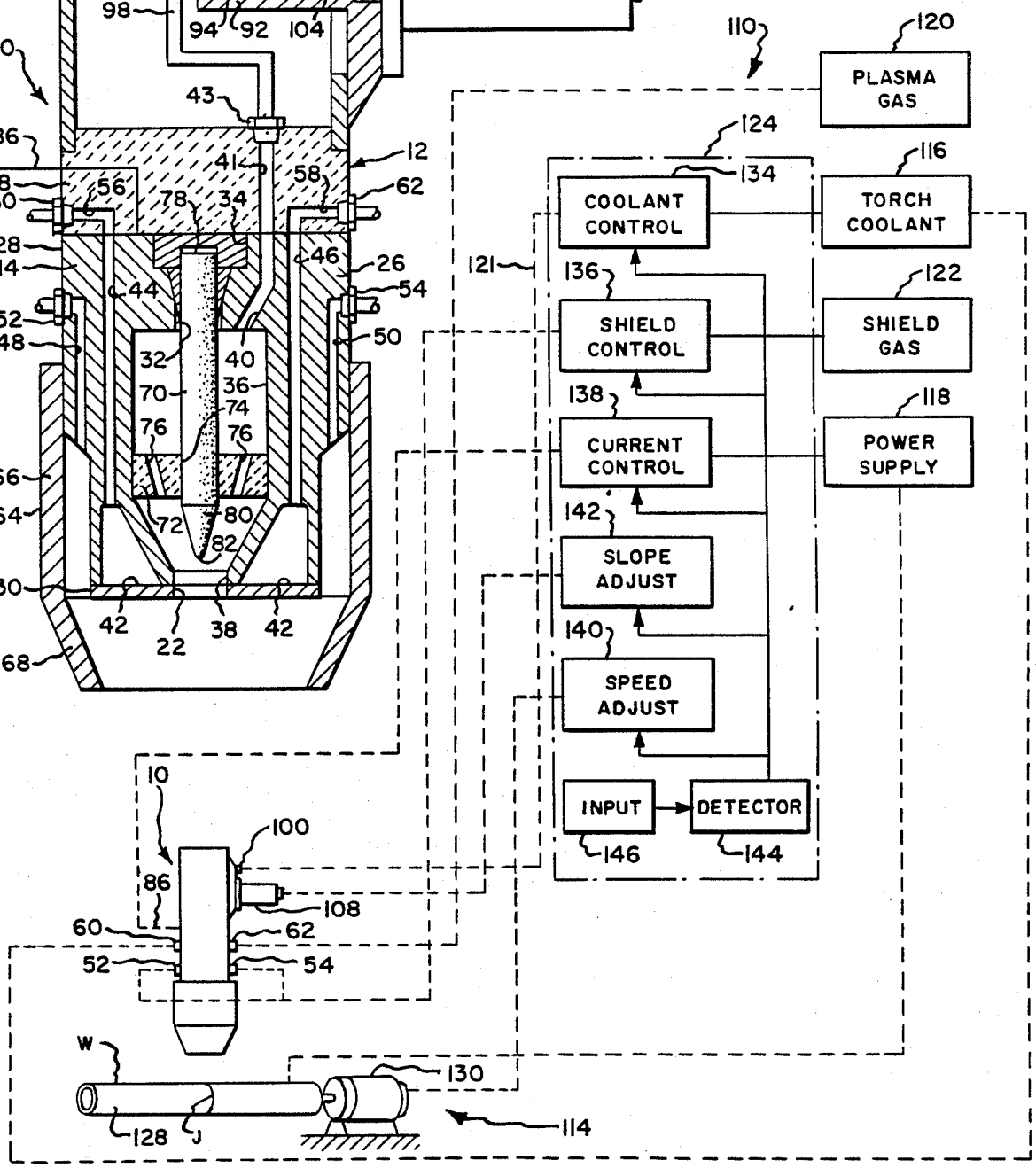
FIG. 1 is a longitudinal cross-sectional view of one embodiment of a torch for a plasma arc welding apparatus in accordance with the present invention.
FIG. 2 is a view showing in block diagram form a control circuit for controlling a plasma arc welding apparatus utilizing the torch of FIG. 1.

Turning now to the drawings in greater detail and considering first FIG. 1, there is shown a plasma arc welding torch 10 in accordance with the present invention. The torch 10 includes a body 12 comprised of a torch section 14, a valve section 16 and an insulator section 18 sandwiched between the torch section 14 and the valve section 16. The body 12 defines a network of flow passages 20 for plasma gas and an orifice 22 through which the plasma gas exits the torch body 12. The torch further includes a gas flow, or slope, valve 24 operatively connected in relatively close flow proximity to the orifice 22. By actuating the valve 24, the flow of plasma gas through the torch 10 can be accurately controlled.

The torch section 14 of the body 12 includes a generally cylindrical body 26 defining an upper end 28, a lower end 30 and a central aperture 32 extending between the ends 28 and 30. The central aperture 32 includes a collet-receiving portion 34 at the upper end 28, a central cavity portion 36 and a reduced portion 38 at the lower end 30. It will be understood that the reduced portion 38 provides the torch orifice 22. Other passageways defined in the torch section 26 include a passageway 40 extending between the upper end 28 and the central cavity portion 36; an annular cavity 42 generally encircling the reduced portion 38, and passageways 44,46 each extending between the upper end 28 and the annular cavity 42. Two additional passageways 48,50 each have one end which opens to a corresponding side of the cylindrical body 26 and another end which opens generally downwardly as shown. The side openings of the passageways 48,50 are internally threaded for receiving fittings 52,54.

The torch section 14 further includes a shield gas cup 64 having a cylindrical portion 66 and a tapered portion 68 extending from one end of the cylindrical portion 66. The cylindrical portion 66 is of such size to be closely and securely retained about the cylindrical body 26 and so that the tapered portion 68 generally encircles the lower end 30 and so that the torch orifice 22 can be exposed to a workpiece through the opening in the tapered portion 68. As will be explained hereinafter, a source for shield gas is operatively connected to the fittings 52,54 for directing a stream of shield gas into the passageways 48,50 during a welding operation. After entering the fittings 52,54, shield gas entering the passageways 48,50 travels through the passageways 48,50, along the walls of the shield gas cup 64 and out the opening of the tapered portion 68.

The insulator section 18 is generally cylindrical in shape and defines passageways 56,58 extending from the passsageways 44,46, respectively, of the cylindrical body 26 of the torch section 14 and opening to opposite sides of the insulating portion 18. The side openings of the passageways 56,58 are internally threaded for receiving insulative fittings 60,62. As will be explained hereinafter, a torch coolant system is operatively connected to the fittings 60,62 for directing a coolant, such as water, into the annular cavity 42 by way of the passageways 46 and 58 out of the torch body 12 by way of passageways 44 and 56 for purposes of cooling the torch section during a welding operation. The insulating portion 18 further defines a passageway 41 extending from the passageway 40 to a fitting 43.

The torch 10 further includes a nonconsumable electrode 70 and a ceramic diffuser 72 mounted within the central aperture 32 of the torch section 14. The diffuser 72 is in the shape of a short,cylindrical plug and is of such size to be closely received by the central cavity portion 36 of the central aperture 32 and defines a central through-opening 74 for closely receiving the body of the electrode 70. The diffuser 72 further defines a series of through-apertures 76,76 positioned about the electrode 70 for directing a flow of plasma gas which enters the central cavity 36 through the passageway 40 around the electrode 70 and generally toward the torch orfice 22.

The electrode 70 is generally elongated in shape, defines an upper end 78 and a lower end 80 and is constructed, for example, of tungsten. The lower end 80 of the electrode 70 is closely received by the through-opening 74 of the diffuser 72 and terminates at a point 82. The upper end 78 is fixedly secured within a collet 84 and the collet 84 is, in turn, secured within the collet-receiving portion 34 of the central aperture 32 so that the electrode 70 is substantially centered therein and so that the longitudinal axis of the electrode 70 is coincident with the longitudinal axis of the torch section 14. With the electrode 70 supported as shown, its lower end 80 is positioned slightly above the orifice opening 22. An electrically-conductive output lead 86, partially embedded in the insulator section 18, is electrically connected to the electrode 70 for supplying an electric current to the electrode 70 during a welding operation.

The valve section 16 of the torch 10 includes a housing 88 and an actuatable valve 90 mounted within the housing 88. The valve 90 includes a valve body 92 defining a threaded recess 94 extending from one side of the valve body 92 and inlet and outlet passageways 96,98, respectively. The inlet passageway 96 communicates between a fitting 100 and the side of the threaded recess 94, as shown, and the passageway 98 communicates between the fitting 43 and the left end as shown of the threaded recess 94.

A valve plug 102 having a stem 104 fixedly attached thereto is threadably received within the threaded recess 94 and is adapted to move linearly along the length of the recess 94 is the plug 102 is rotated relative to the valve body 92. A reversible servomotor 108 sealingly covers the right end as shown of the recess 94, and the stem 104 is connected by means of a coupling 106 to the shaft of the servomotor 108 so that by actuating the servomotor 108, the plug 102 is moved in one direction or the other across the opening of the passageway 96 defined in the side of the recess 94 to controllably restrict the flow of gas passing through the valve section 16 between the fittings 100 and 43.

With reference to FIG. 2, there is shown a schematic representation of an automatically-controlled plasma welding apparatus, generally indicated 110, in which the torch 10 of FIG. 1 is utilized. In the apparatus 110, the torch 10 is supported in a stationary condition for welding a tubular workpiece W along a joint J encircling the workpiece W as the workpiece W is rotated about its longitudinal axis. The apparatus 10 includes a fixture 114 for supporting the workpiece W in a condition to be worked upon by the torch 10, means 116 for circulating a coolant through the torch 10, a welding power supply 118, a plasma gas source 120, a shield gas source 122, and a controller 124 for accurately controlling various welding parameters hereinafter discussed.

The workpiece W is in the form of a metal tube 128, and the fixture 114 is adapted to hold the tube 128 in close physical proximity to the torch orifice 22 and includes an electric motor 130 for rotating the tube 128 about its longitudinal axis. Thus, by rotating the tube 128, each point along the weld joint J is exposed to the torch orifice 22.

The coolant circulating means 116 includes a heat exchanger and is appropriately connected by means of conduits to the torch fittings 60 and 62 for circulating a suitable torch coolant through the torch 10. During a welding operation, the torch coolant enters the torch 10 through the fitting 62, absorbs torch heat while flowing through the annular cavity 42 (FIG. 1), exits the torch 10 through the fitting 60, and rejects heat in the heat exchanger of the circulating means 116.

The shield gas source 122 is connected to the torch fittings 52 and 54 for directing a stream of shield gas into the torch 10. During a welding operation, the shield gas effectively protects a heated or molten portion of the workpiece W exposed to the torch orifice 22 from contamination by atmospheric air.

The plasma gas source 120 is operatively connected by means of a conduit 121(FIG. 1) to torch fitting 100 for directing a stream of plasma gas through the torch orifice 22. The power supply 18 is operatively connected between the wire lead 86 of the torch 10 and the workpiece W in a manner well-known in the art for drawing an arc between the torch electrode 70 (FIG. 1) and the workpiece W. With the power supply 118 energized and plasma gas flowing into the torch 10, the plasma gas becomes heated and ionized as it approaches the orfice 22 so that the gas stream exiting the orifice 22 provides an intense and concentrated heat source.

The controller 124 is in the form of a computer or microprocessor and includes control means 134 operatively connected between the coolant circulating means and torch 10 for initiating and controlling the flow of coolant through the torch 10, control means 136 associated with the shield gas source 122 for controlling the flow of shield gas from source 122, current control means 138 appropriately wired to the power supply 118 for controlling the weld current, and control means 140 for controlling the actuation and speed of the electric motor 130 to thereby control the relative speed between the surface of the workpiece tube 128 and the torch orifice 22. The controller 124 further includes means 142 appropriately connected in controlling relationship with the servomotor 108 for controlling the operation of the slope valve 90.

During a welding operation, the controller 124 generates welding commands in response to input received. For this purpose, the controller 124 includes a detector 144 which reads a welding program 146 carried by, for example, magnetic tape and converts the program into commands that are transmitted to the various control means 134,136,138,140 and 142 by means of connecting wires.

Because the slope valve 90 is operatively connected in relatively close flow communication with the torch orifice 22, any adjustment of the valve 90 results in a prompt adjustment of the plasma gas stream exiting the torch orifice 22. Thus, the positioning of the slope valve 90 in close flow communication with the torch orifice 22 provides the apparatus 110 with means by which the flow of the plasma gas can be accurately controlled.

Figure 3:
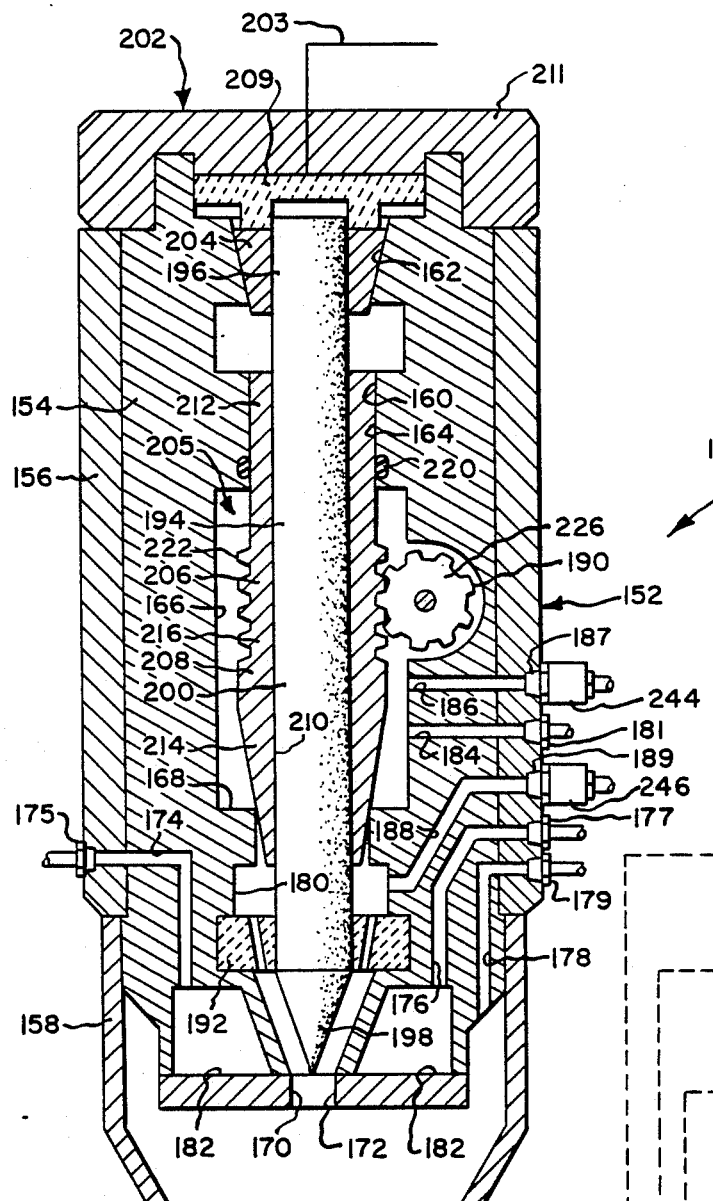
FIG. 3 is a view similar to FIG. 1 illustrating an alternative embodiment of a torch for a plasma arc welding apparatus in accordance with the present invention.

With reference to FIG. 3 there is shown an alternative plasma torch 150 in accordance the present invention. The torch 150 includes a body 152 having a torch section 154 which is substantially encased within a housing 156. The torch section 154 has a substantially cylindrical outer surface, and the housing 156 is comprised of an epoxy potting compound layered about the cylindrical surface of the torch section 154. Tightly secured about the lower end of the torch section 154 is a shield gas cup 158 defining a lowermost opening 159.

The torch section 154 includes a body having a central through-aperture 160 having a collet-receiving portion 162 adjacent the upper end of the section 154, a relatively narrow guideway 164, an enlarged cavity portion 166 defining a shoulder 168 at the lower end of the cavity portion 166 as shown, a reduced end section 170 adjacent the loewr end of the section 154 and defining an orifice 172 of the torch 150, and a cylindrical cavity 180 positioned between the shoulder 168 and the orifice 172. The torch section 154 further defines an annular coolant cavity 182 generally encircling the orifice 172.

Collectively, the torch section 154 and housing 156 define coolant passageways 174 and 176 which each extend between a corresponding one of the fittings 175 and 177 mounted in the housing 156 and the coolant cavity 182, a passageway 178 extending from the fitting 179 and through which shield gas is directed within the interior of the cup 158, a plasma gas inlet passageway 184 which extends from the fitting 181 and communicates with the enlarged cavity portion 166 of the through-aperture 160, a first pressure-sensing port 186 which extends from a fitting 187 and communicates with the cavity portion 166, and a second pressure sensing port 188 which extends from a fitting 189 and communicates with the cylindrical cavity 180. For purposes of sensing the pressure of the plasma gas immediately upstream and downstream of the shoulder 168, pressure transducers 244,246 are connected to the torch fittings 187,189, respectively. The torch section 154 and housing 156 further define an opening (not shown) through which a drive mechanism 190, hereinafter described, is rotatably received.

The torch 150 further includes a centrally-apertured ceramic gas diffuser 192 mounted adjacent the reduced end section 170 of the through-aperture 160 and an electrode 194 supportedly mounted in a stationary condition within the through-aperture 160. The electrode 194 is elongated with an upper end portion 196, a lower end portion 198 and a mid-portion 200 positioned between the upper and lower end portions 196 and 198. The upper end 196 is secured within a collet assembly 202 having a collet 204, a collet actuator 209 and a cap 211. More specifically, the upper end 196 is tightly received by the collet 204 and thereby held in a fixed position relative to the torch body 152. The lower end portion 198 is received by the central aperture of the diffuser 192. A lead wire 203 extends through the cap 206 and is electrically connected to the electrode 194.

The torch 150 further includes valving means 205 including a valve member 206 in the form of an elongated sleeve-like gear body 208 having a central through-bore 210 slidably accepting the mid-portion 200 of the electrode 194. The valve member body 208 includes an upper portion 212, a tapered or needle-like lower portion 214, and a mid-portion 216. The upper portion 212 is closely and slidably received by the guideway 164 of the through-aperture 160, and an O-ring 220 is positioned within an annular groove defined within the guideway 164 for sealing the guideway 164 and upper portion 212. The mid-portion 216 of the valve member body 208 defines rack-type teeth 222 extending along the exterior thereof for a reason hereinafter apparent.

The lower portion 214 of the valve member body 208 is adapted to cooperate with the shoulder 168 of the through-aperture 160 for controllably restricting the flow of gas from the enlarged cavity portion 166 to the reduced end section 170 as the valve member body 208 is moved axially along the through-aperture 160 and guided along the length of the electrode 194. Thus, the valve member body 208 and shoulder 168 act as an actuatable needle valve and seat to limit the flow of plasma gas through the torch 150. When the valve member body 208 moves into engagement with the shoulder 168, the flow of plasma gas through the torch 150 is shut off.

For purposes of actuating the valving means 205, a reversible servomotor 224 (FIG. 4) is supported adjacent the torch 150 and suitably connected to the drive mechanism 190, previously introduced, for rotation thereof about an axis which remains stationary with respect to the torch section 154. The drive mechanism 190 is in the form of a pinion 226 suitably meshed with the rack-type teeth 222 so that rotation of the pinion 226 in one rotational direction or the other moves the valve member body 208 in one axial direction or the other relative to and along the length of the electrode 194 and torch section 154. Thus, by controlling the actuation of the servomotor 224, the flow of plasma gas through the torch 150 is controlled.

Figure 4:
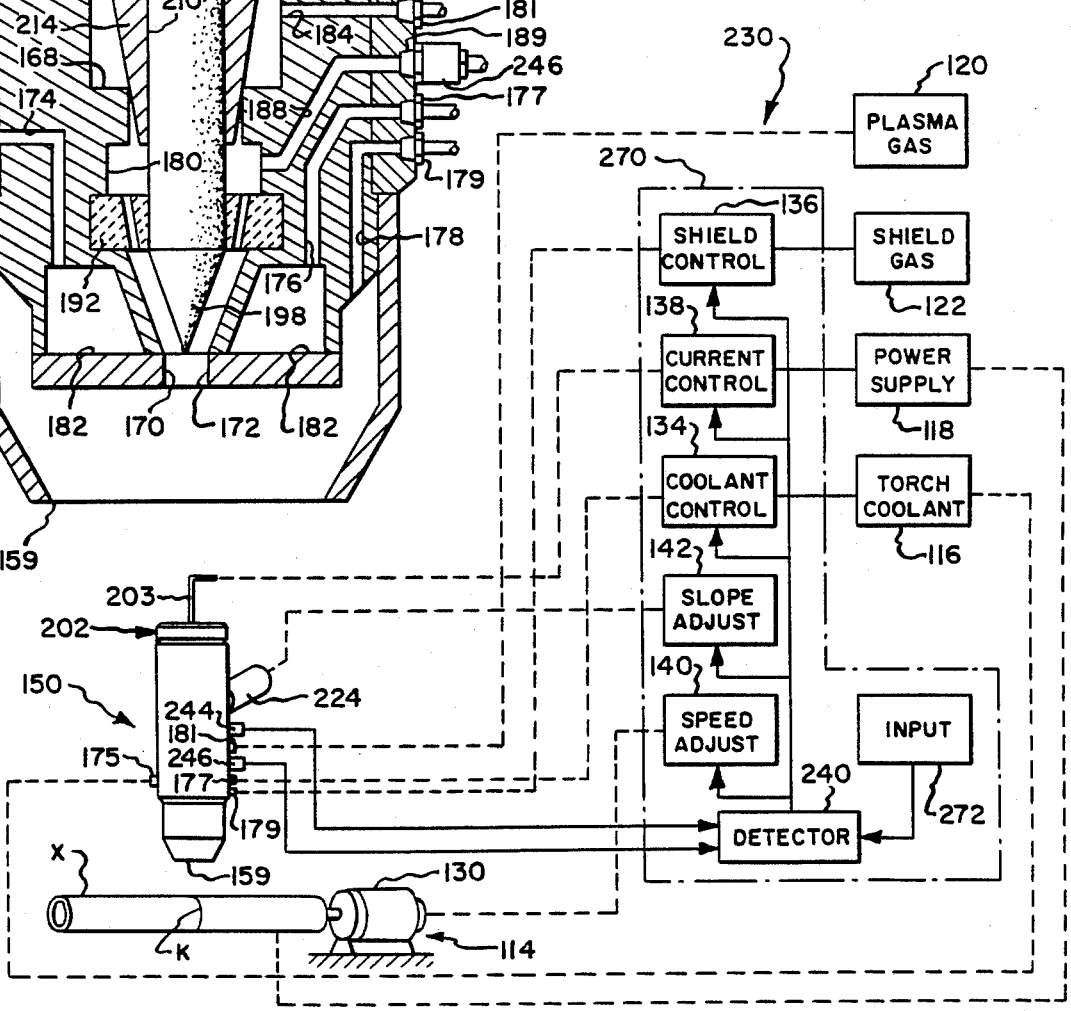
FIG. 4 is a view showing in block diagram form a control circuit for controlling a plasma arc welding apparatus utilizing the torch of FIG. 3.

There is shown in FIG. 4 a schematic representation of a plasma welding apparatus, generally indicated 230, in which the torch 150 of FIG. 3 is utilized for welding a workpiece X along a weld joint K. Components of the welding apparatus 230 which correspond to components of the welding apparatus 110 of FIG. 2 are accordingly given the same reference numerals.

In the apparatus 230, the plasma gas source 120 is connected to the torch fitting 181 for directing a flow of plasma gas into the torch 150, and the shield gas source 122 is connected to the torch fitting 179 for directing a flow of shield gas out of the opening 159 in the shield gas cup 158. The welding power supply 128 is appropriately wired between the workpiece X and the wire lead 203 for drawing an arc between the electrode 194 and workpiece X. The torch coolant source 116 is connected to the torch fittings 175 and 177 for circulating a torch coolant through the annular cavity 182 of the torch 150.

The welding apparatus 230 further includes a controller 270 for controlling various welding parameters during a welding operation. As does the controller 124 of the FIG. 2 welding apparatus, the controller 270 of FIG. 4 includes means 136 for controlling the flow of shield gas through the torch, current control means 138 for controlling the weld current during a welding operation, control means 134 for controlling the flow of torch coolant through the torch 150, and control means 140 controlably connected the fixture motor 130 for controlling the relative rate of speed between the surface of the workpiece X and the torch orifice 172. The controller 270 further includes control means 142 appropriately wired in controlling relationship with the servomotor 224 for adjusting the axial position of the valve member body 208 in relation to the valve seat, or shoulder 168, and to thereby control the flow of plasma gas through the torch 150.

The controller 270 further includes a detector 240 for generating welding commands in response to input received and feedback sensed during a welding operation. To this end, the detector 240 is adapted to read an input program 272 for initiating a welding operation and is appropriately connected to the pressure transducers 244,246 for sensing the plasma gas pressure immediately upstream and downstream of the valve seat 168 during a welding operation. The detector 240 receives the sensed signals from the transducers 244 and 246 and determines what adjustments in the welding parameters, such as the rate of plasma gas flow, are necessary so that the welding operation continues as desired. From such a determination, detector 240 produces and sends appropriate command signals to the control means 134,136,138, 140 and 142.

It will be understood that various modifications and substitutions can be made to the aforedescribed embodiments without departing from the spirit of the invention. For example, although the slope control valve 90 of the torch 10 of FIGS. 1 and 2 has been shown and described as a faucet-type of valve, an alternative valve may take any of various forms such as a needle-type valve. Furthermore, for purposes of actuating some of the various types of alternative valves, a valve actuator, described above in the aforedescribed embodiments as a reversible servomotor, may take an alternative form such as a stepping motor. Accordingly, the aforedescribed descriptions are intended for purposes of illustration and not as limitation.

I claim:

1. In automatically-controlled plasma arc welding apparatus including a plasma torch positionable in operative relationship with a workpiece for working thereon and control means including a gas slope valve controlling various welding parameters such as plasma gas slope, the torch including a body defining a flow passage for plasma gas and an orifice through which plasma gas exits the torch as a high-temperature jet stream, the improvement comprising:

the operative positioning of the gas slope valve in relatively close flow proximity to the torch orifice for controllably regulating the flow of plasma gas through the torch orifice between two preselected flow rates to thereby accurately control the plasma gas exiting the torch during a welding operation, pressure-sensing means associated with the gas flow line for sensing the pressure of plasma gas immediately upstream and downsteam of the gas slope valve and generating signals corresponding to the sensed pressure and control means for sensing the signals generated by the pressure-sensing means and controlling the various welding parameters in response to the received signals.

2. The improvement of claim 1 wherein the gas slope valve is associated with the torch body.

3. The improvement of claim 1 wherein the gas flow passage defines a gas inlet through which plasma gas enters the torch and the gas slope valve is operatively connected between the gas inlet and the torch orifice.

4. The improvement of claim 1 wherein the gas valve is a needle-type valve.

5. The improvement of claim 1 wherein the torch includes an electrode, the gas flow passage defines a valve seat, the gas valve includes a valve member supportedly mounted in the gas flow passage for movement relative thereto and toward and away from the valve seat so that movement of the valve member relative to the flow passage moves the valve member toward and away from the valve seat to controllably restrict the flow of plasma gas through the torch orifice.

* * * * *